UNITED STATES PATENT OFFICE.

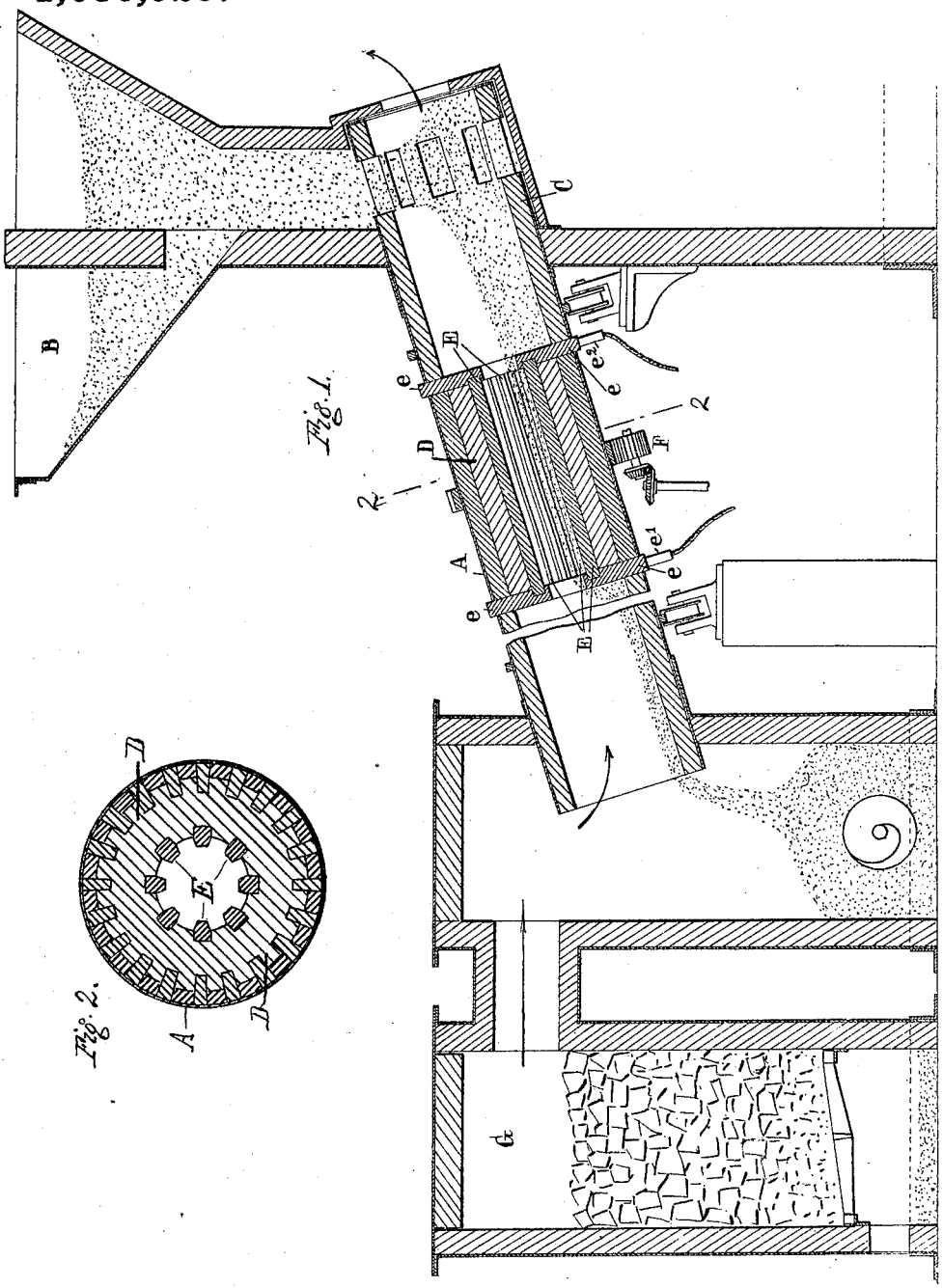

OTTOKAR SERPEK, OF PARIS, FRANCE, ASSIGNOR TO SOCIETE GENERALE DES NITRURES, OF PARIS, FRANCE.

PROCESS OF MANUFACTURING ALUMINIUM NITRID.

1,030,929.  Specification of Letters Patent.  Patented July 2, 1912.

Application filed April 6, 1911. Serial No. 619,350.

*To all whom it may concern:*

Be it known that I, OTTOKAR SERPEK, a subject of the Emperor of Austria-Hungary, and residing at Paris, France, have invented a certain new and useful Process of Manufacturing Aluminium Nitrid, of which the following is a specification.

This invention relates to a process of manufacturing aluminium nitrid, the object of my invention being to obviate certain difficulties heretofore experienced in the manufacture of this product, as will be hereinafter pointed out.

It is well known that if alumina be heated to a high temperature in the presence of carbon, it will combine with nitrogen to form aluminium nitrid. To obtain this reaction under the best conditions it is necessary to operate at high temperature—in the neighborhood of 1800° C. while at the same time maintaining a temperature below that at which carbids are formed, inasmuch as the latter are difficult to decompose. Heretofore it has been customary to pass an electric current through a mass of comminuted and intimately mixed carbon and alumina in an electric arc furnace through which nitrogenous gas is simultaneously blown. This practice however is attended with the serious defect that the heat resulting from the resistance, afforded by the mass, is unequally distributed, being too high in certain zones and too low in others. In the overheated zones a stratum of carbid is formed which is difficult to decompose and the progress of the reaction is thus obstructed so that the process yields a product containing principally carbids, more or less pure, mixed with a small proportion of nitrids.

I have now discovered that a much more complete, if not perfect reaction can be secured if the mass is heated by being brought into contact with resistance elements through which alone the current passes. This resistance element is preferably composed of a mixture in suitable proportions of carbon and aluminium nitrid and preferably takes the form of a series of resistance members, which during the reaction are set in motion so as to form stirrers which agitate the finely divided mixture of carbon and alumina and thus not only serve to evenly heat the same, but to subject them more thoroughly to the action of the nitrogen which is blown through the reaction chamber. By reason of the comminuted condition of the mass treated, which is furthermore only a poor conductor of electricity, and the further fact that the temperature is not permitted to reach a point sufficiently high to effect the fusion of the mass, the current does not pass through the latter but remains in the resistance elements and the reaction heat is thus obtained from the contact of the mass with these alone, as distinguished from the prior process in which the current is passed through the mass and heats the latter by the resistance encountered therein. In this connection it may be pointed out that the nitrid is neither fusible nor volatile at the temperature at which the process is carried out viz. from 1600° to 2000° C.; furthermore it neither contracts nor does it react upon the carbon or the elements of the mass treated. It may thus very satisfactorily be employed in mixture with carbon in proportions suitable to form the resistance element. In this respect it is a great improvement over a refractory substance, such as magnesia since if the carbon be mixed only in slight quantity with the latter, in order to obtain a high resistance, the heat generated is apt to fuse the resistance element; while if more carbon be added to avoid this difficulty then the resistance afforded is at once considerably diminished and the temperature correspondingly lowered. Suitable proportions of the nitrid and carbon for the resistance element are from 60 per cent. to 80 per cent. nitrid to from 40 to 20 per cent. carbon.

The process may be carried out in various ways, but I have illustrated in the accompanying drawing an apparatus suitable for the purpose.

A suitable mixture of carbon and alumina is introduced to the reaction chamber A from the hopper B, through the channel C. The reaction chamber shown is given the form of a rotary furnace lined with a suitable neutral facing D, preferably composed of agglomerated aluminium nitrid, in which are embedded the resistance elements E which extend from end to end of the furnace and are connected to an annular conducting band $e$ arranged at each end of the furnace and to which current is led through the brushes $e^1$, $e^2$. A rotary motion is imparted to the furnace by any suitable means, for example, through gearing F, so that the resistance elements which project beyond the face of the lining D act during the rotation of the furnace as stirrers, thus bringing the same into contact with all parts of the mass treated and evenly heating the same while at the same time serving to insure a more intimate contact therewith of the gas blown through the furnace from the generator G. While in the furnace the carbon alumina mixture is heated to a temperature from 1600° to 2000° C. at which temperature it combines with the nitrogen in the gas to form aluminium nitrid.

Various other ways of carrying out my improved process will readily suggest themselves as well as other modifications in the details of the process.

It is obvious that alumina may be used in the state of bauxite or other materials containing alumina may be employed.

I claim as my invention:—

1. In the process of manufacturing aluminium nitrid from aluminious material, the step of feeding a finely divided mixture of said material and carbon in the presence of nitrogen over and in contact with heated electric resistance elements, through which alone the electric current passes, substantially as described.

2. In the process of manufacturing aluminium nitrid from aluminious material, the step of subjecting a finely divided mixture of said material and carbon to the action of nitrogen, while feeding and agitating said mixture over and in contact with heated electric resistance elements, through which alone the electric current passes, substantially as described.

3. In the process of manufacturing aluminium nitrid from aluminious material, the step of subjecting a finely divided mixture of said material and carbon to the action of nitrogen, while passing said mixture over, and agitating the same by, heated electric resistance elements, through which alone the electric current passes, substantially as described.

In testimony whereof I have signed my name to this specification, in the presence of two subscribing witnesses.

OTTOKAR SERPEK.

Witnesses:
 CHARLES DONY,
 LEON PEILLET.